UNITED STATES PATENT OFFICE.

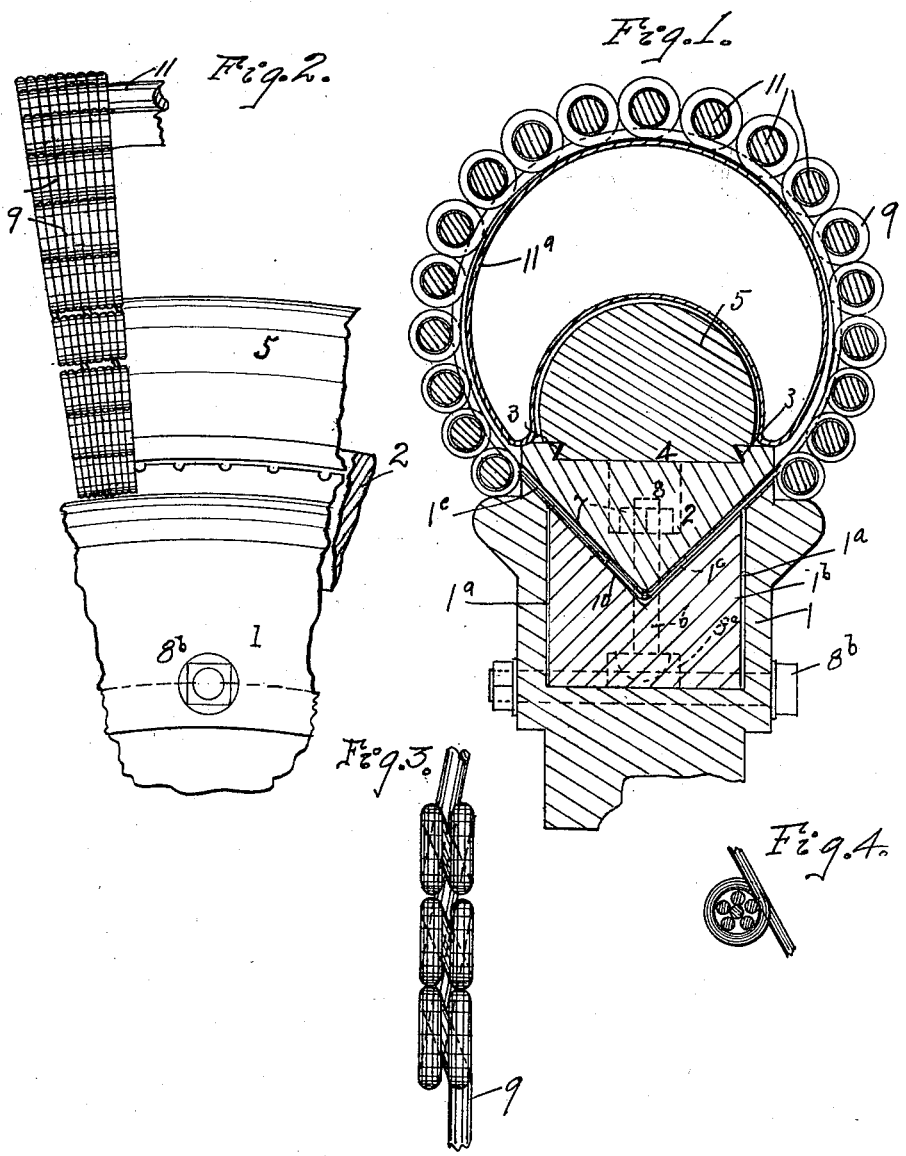

EUGENE JACQUEMIN, OF KENT, WASHINGTON.

RESILIENT TIRE.

1,141,641. Specification of Letters Patent. Patented June 1, 1915.

Application filed April 1, 1914. Serial No. 828,925.

*To all whom it may concern:*

Be it known that I, EUGENE JACQUEMIN, a citizen of the United States, and a resident of Kent, in the county of King and State of Washington, have invented certain new and useful Improvements in Resilient Tires, of which the following is a specification.

This invention relates to resilient tires, and more especially to such tires as are adapted for use in connection with the traction wheels of a power-driven vehicle, and has for its principal object to provide a tire of this class which is very durable, resilient, and at the same time puncture-proof and non-skidding. The invention will be more fully described and explained in the following specification, illustrated in the accompanying drawings and pointed out in the appended claim.

In the drawings, Figure 1 is a cross-sectional view of my device as applied to a felly or rim and showing the means for securing the tire to the rim. Fig. 2 is a fragmentary side elevation of the same, partly in section. Fig. 3 is an enlarged detail view of the wire coils which form the tire proper. Fig. 4 is a similar view of a modified form of filler for the said coils.

Referring now more particularly to the drawings, reference numeral 1 designates the rim or felly of a wheel, which may be generally of any suitable design, except as hereinafter described. The outer circumferential surface of the rim is cut out so as to form an annular channel indicated at 1$^a$, and into which is fitted a circular member 1$^b$. The said member is similarly channeled to receive a V-shaped member 2 which is, in turn, recessed upon its entire circumferential surface and may be under-cut as indicated at 3, to receive the correspondingly shaped portion 4 of a bumper 5 which is preferably of rubber or other resilient material. The member 2 is cut into a suitable number of sections and the same firmly secured to the member 1$^b$ by any approved means, such as the bolt nut shown in dotted lines at 6 and 7 respectively, the member 2 being countersunk as indicated in the dotted lines at 8 to receive the nut 7, and the member 1$^b$ being similarly countersunk at 8$^a$ to receive the head of the said bolt. The member 1$^b$ may be secured to the rim 1 in any suitable manner such as a number of bolts indicated at 8$^b$. The walls of my improved tire are formed of sections of individual wires 9, each of which is coiled as plainly shown in the drawings. The said coiled wires are arranged side by side (see Fig. 2), and the terminals of each of said wires are hooked as indicated at 10. Each of the coils of the said wires may have a filler which, in this instance is a separate flexible rod 11, of a length approximately equal to that of the circumference of the tire, or there may be a plurality of smaller rods such as shown in Fig. 4. The convolutions of the said wires, it will be noted, vary in size, the larger convolutions being positioned at the extreme top or outer face of the tire and gradually diminishing toward the bottom thereof. The rods 11 form a filler for the convolutions, as well as means for connecting together the various wires 9 so as to form a rather compact woven wire fabric.

11$^a$ indicates an inner tube which may be of the usual form and construction, which when inflated, will of course take about the shape in cross section as seen in Fig. 1. It will be understood that it is not absolutely essential that an inner tube be used at all as there is ample resiliency and stability in the tire itself without any pneumatic feature.

From the foregoing it will be seen that I have provided a vehicle tire having all of the desirable qualities of a pneumatic tire, and yet, particularly due to the peculiar formation and material of its outer walls, avoids a very undesirable feature common to pneumatic tires, viz.: tendency to skid and liability to puncture.

While I have shown and described a particular form of embodiment of my invention, I am aware that many minor changes in the details thereof will readily suggest themselves to others skilled in the art without departing from the spirit and scope of my invention, and I therefore desire to avoid being limited to the exact form shown and described.

What I claim as new and desire to protect by Letters Patent is:—

In an article of the class described, the combination with an annularly grooved felly, of a plurality of wires arranged side by side, and each of which has convolutions adjacent to each other and which vary in size, the largest of which convolutions is at the midsection of the wire, the ends of each wire being formed into V shaped hooks, a circular and annularly recessed member fitted within the annular groove around the felly, and means for securing the said member to the felly, a second circular member which is V shaped and which fits within the annular recess in the first mentioned member and with which the V shaped hooks upon the said wires are adapted to engage, nut and bolt means for securing the said members to each other, whereby the said V shaped hooks are bound between the members, and a filler adapted to be passed along through the convolutions in the wires whereby each of the wires is held in place with respect to the others.

EUGENE JACQUEMIN.

Witnesses:
FRED P. GORIN,
EMMA KROGER.